(12) United States Patent
Sacks et al.

(10) Patent No.: US 7,567,403 B2
(45) Date of Patent: Jul. 28, 2009

(54) BI-DIRECTIONAL SERVO TRACK WRITING TO MINIMIZE SIDEWALL WRITING AT HIGH SKEW ANGLES

(75) Inventors: Alexei Hiram Sacks, Edina, MN (US); Haoying Sun, Austin, TX (US); Thomas Zirps, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/810,320

(22) Filed: Jun. 4, 2007

(65) Prior Publication Data

US 2008/0002277 A1  Jan. 3, 2008

Related U.S. Application Data

(63) Continuation-in-part of application No. 10/262,830, filed on Oct. 2, 2002, now abandoned.

(60) Provisional application No. 60/374,082, filed on Apr. 18, 2002.

(51) Int. Cl.
*G11B 21/02* (2006.01)
(52) U.S. Cl. .......................... 360/75; 360/48
(58) Field of Classification Search ........... None
See application file for complete search history.

(56) References Cited

U.S. PATENT DOCUMENTS

| | | |
|---|---|---|
| 5,523,903 A | 6/1996 | Hetzler et al. |
| 5,561,566 A | 10/1996 | Kigami et al. |
| 5,587,850 A | 12/1996 | Ton-that |
| 5,636,075 A | 6/1997 | Nishimura et al. |
| 5,677,819 A | 10/1997 | Seko et al. |
| 5,739,975 A | 4/1998 | Parks et al. |
| 5,757,574 A | 5/1998 | Chainer et al. |
| 5,768,044 A | 6/1998 | Hetzler et al. |
| 5,784,220 A | 7/1998 | Nishimura et al. |
| 5,790,341 A | 8/1998 | Cunningham et al. |
| 5,796,543 A | 8/1998 | Ton-That |
| 5,901,003 A | 5/1999 | Chainer et al. |
| 5,907,448 A | 5/1999 | Watanabe et al. |
| 5,909,333 A | 6/1999 | Best et al. |
| 5,946,157 A | 8/1999 | Codilian et al. |
| 5,959,800 A | 9/1999 | Hartung et al. |
| 5,982,173 A | 11/1999 | Hagen |
| 5,995,342 A | 11/1999 | Cohen et al. |
| 6,005,738 A | 12/1999 | Chainer et al. |

(Continued)

FOREIGN PATENT DOCUMENTS

JP     2000268516     9/2000

(Continued)

*Primary Examiner*—Jason C Olson
(74) *Attorney, Agent, or Firm*—Fellers, Snider, et al.

(57) ABSTRACT

An apparatus and associated method of servo writing to a storage media is provided that writes servo information at a first orientation pattern from a first storage extent of the storage media to a medial portion of the storage media, and writes servo information at a second orientation pattern different than the first orientation pattern from an opposing storage extent of the storage media to approximately the medial portion, so that the patterns at approximately the medial portion are positionally interlaced.

22 Claims, 13 Drawing Sheets

U.S. PATENT DOCUMENTS

| | | |
|---|---|---|
| 6,008,960 A | 12/1999 | Belser |
| 6,014,283 A | 1/2000 | Codilian et al. |
| 6,025,971 A | 2/2000 | Inoue et al. |
| 6,031,671 A | 2/2000 | Ayres |
| 6,031,680 A | 2/2000 | Chainer et al. |
| 6,067,204 A | 5/2000 | Tremaine |
| 6,075,668 A | 6/2000 | Chainer et al. |
| 6,078,450 A | 6/2000 | Chainer et al. |
| 6,091,567 A | 7/2000 | Cooper et al. |
| 6,094,413 A | 7/2000 | Guerra |
| 6,101,055 A | 8/2000 | Chainer et al. |
| 6,101,063 A | 8/2000 | Chainer et al. |
| 6,118,603 A | 9/2000 | Wilson et al. |
| 6,122,133 A | 9/2000 | Nazarian et al. |
| 6,144,517 A | 11/2000 | Watanabe et al. |
| 6,204,980 B1 | 3/2001 | Momtaz et al. |
| 6,204,991 B1 | 3/2001 | Karube |
| 6,226,441 B1 | 5/2001 | Hartung et al. |
| 6,236,525 B1 | 5/2001 | Cates et al. |
| 6,249,399 B1 | 6/2001 | Chainer et al. |
| 6,252,732 B1 | 6/2001 | Chainer et al. |
| 6,259,574 B1 | 7/2001 | Chainer et al. |
| 6,288,861 B1 | 9/2001 | Blaum et al. |
| 6,301,071 B2 | 10/2001 | Chainer et al. |
| 6,307,697 B1 | 10/2001 | Chainer et al. |
| 6,320,718 B1 | 11/2001 | Bouwkamp et al. |
| 6,324,027 B1 | 11/2001 | Chainer et al. |
| 6,952,320 B1 | 10/2005 | Pollock et al. |
| 7,330,322 B2 | 2/2008 | Hanson et al. |
| 7,333,281 B2 * | 2/2008 | Park et al. ............. 360/53 |
| 7,388,728 B1 * | 6/2008 | Chen et al. ............ 360/77.08 |
| 2003/0197968 A1 | 10/2003 | Sacks |
| 2005/0264917 A1 | 12/2005 | Yano |
| 2006/0171050 A1 | 8/2006 | Hanson et al. |
| 2008/0239557 A1 | 10/2008 | Gerasimov |

FOREIGN PATENT DOCUMENTS

| | | | |
|---|---|---|---|
| JP | 2000268516 A | * | 9/2000 |
| JP | 2001189062 | | 10/2001 |

* cited by examiner

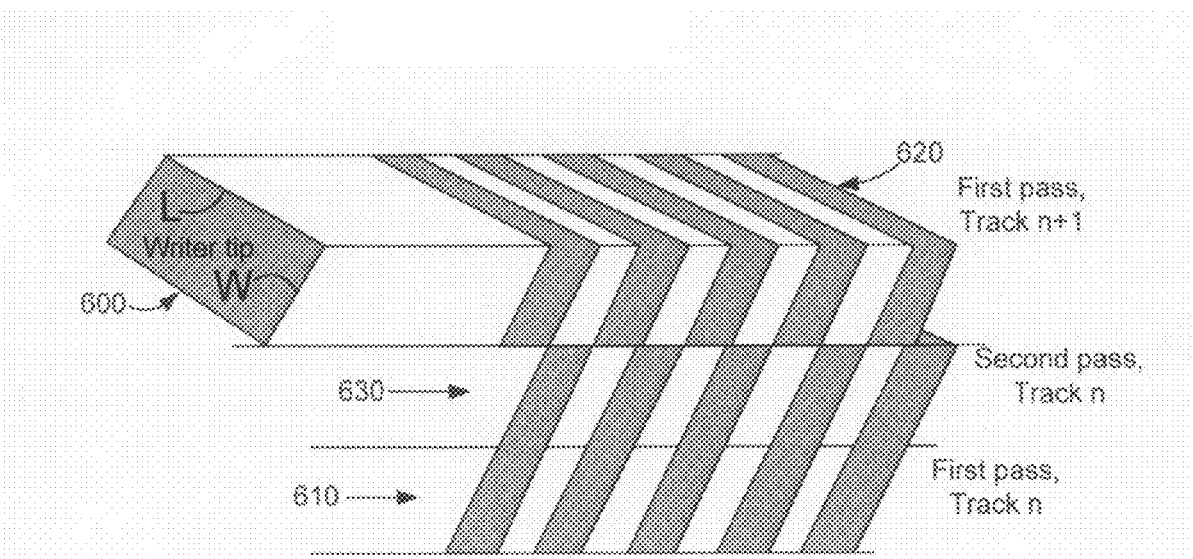
FIG. 6
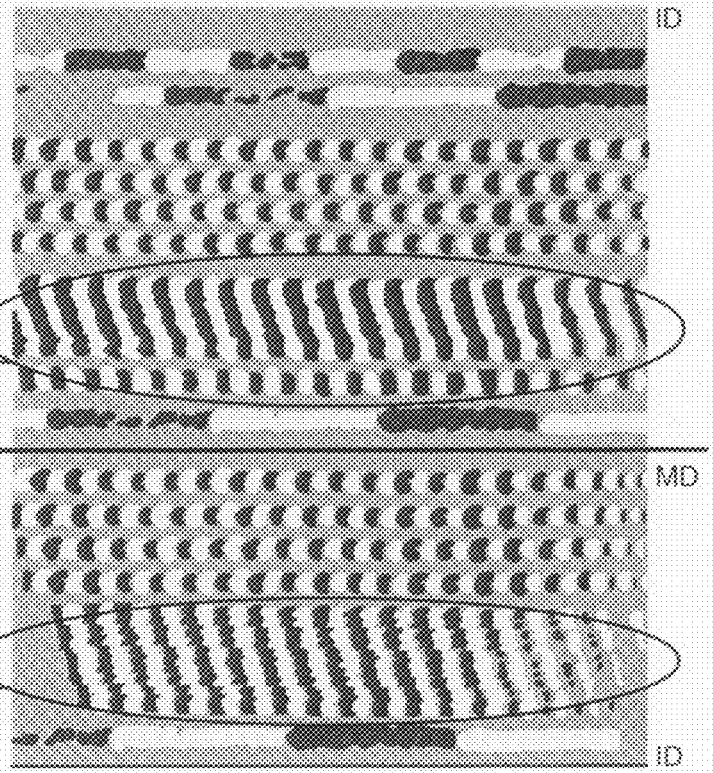
FIG. 7A
FIG. 7B

BI-DIRECTIONAL SERVO TRACK WRITING TO MINIMIZE SIDEWALL WRITING AT HIGH SKEW ANGLES

CROSS REFERENCE TO RELATED APPLICATIONS

This application is a continuation-in-part of copending application Ser. No. 10/262,830 filed on Oct. 2, 2002, which claims the benefit of U.S. Provisional Application No. 60/374,082 filed on Apr. 18, 2002.

FIELD

The embodiments of the present invention are directed generally to servo tracks on data storage media and more particularly but without limitation to minimizing sidewall of servo tracks.

BACKGROUND

The typical disc drive in a computer has at least one disc that stores information. Referring to FIG. 1, a disc 100 is shown that has an associated actuator 110. At the distal end of actuator 110 is a head 120. The information is written and read in tracks, such as but not limited to the circular track 130, by head 120. The disc drive then must be able to follow each data track to read and write the information. To assist in such data track follow, servo information is written on each data track at intervals. The servo information is used by the disc drive to, among other things, keep the head aligned with the desired data track. The servo information is typically written prior to writing information to the disc.

Due to the structure of the disc drive, the head azimuth usually has a non-zero azimuth angle with respect to the data track where the servo information is written. This is known as skew. Also due to that structure, the skew changes as the head moves between the inner diameter (ID) and outer diameter (OD). At some point between the ID and OD, the head skew transitions between positive and negative.

There is a long felt need to improve both the effectiveness and the efficiency with which these processes can be practiced. The embodiments of the present invention are directed to that need.

SUMMARY

Embodiments of the present invention are directed to bidirectional servo track writing and retrieving data from storage media with servo tracks written bidirectionally.

In some embodiments a method of servowriting to a storage media is provided including writing servo information at a first orientation pattern from a first storage extent of the storage media to a medial portion of the storage media, and writing servo information at a second orientation pattern different than the first orientation pattern from an opposing storage extent of the storage media to approximately the medial portion, so that the patterns at approximately the medial portion are positionally interlaced.

In some embodiments an apparatus is provided with a storage media having servo wedges defining tracks that are written bi-directionally toward a medial portion of the media, wherein servo wedges written in one direction are positionally offset with respect to servo wedges written in the other direction so that the servo wedges of respective tracks near the medial portion are positionally interlaced.

In some embodiments a data storage device is provided with an actuator that is moveable with respect to a storage media in a data transfer relationship therewith, and means for retrieving servo information stored to the media in an outer zone of the media between a predetermined position of the actuator and a data storage extent of the media, and stored to the media in an inner zone of the media between the predetermined position and an opposing storage extent of the media.

BRIEF DESCRIPTION OF THE DRAWINGS

FIG. 6 shows writing servo information in another direction from FIG. 4 taking into account head skew according to the present invention.

FIGS. 7A-7B show a MFM of servo patterns written with and without embodiments of the present invention.

DETAILED DESCRIPTION

Figure 1:
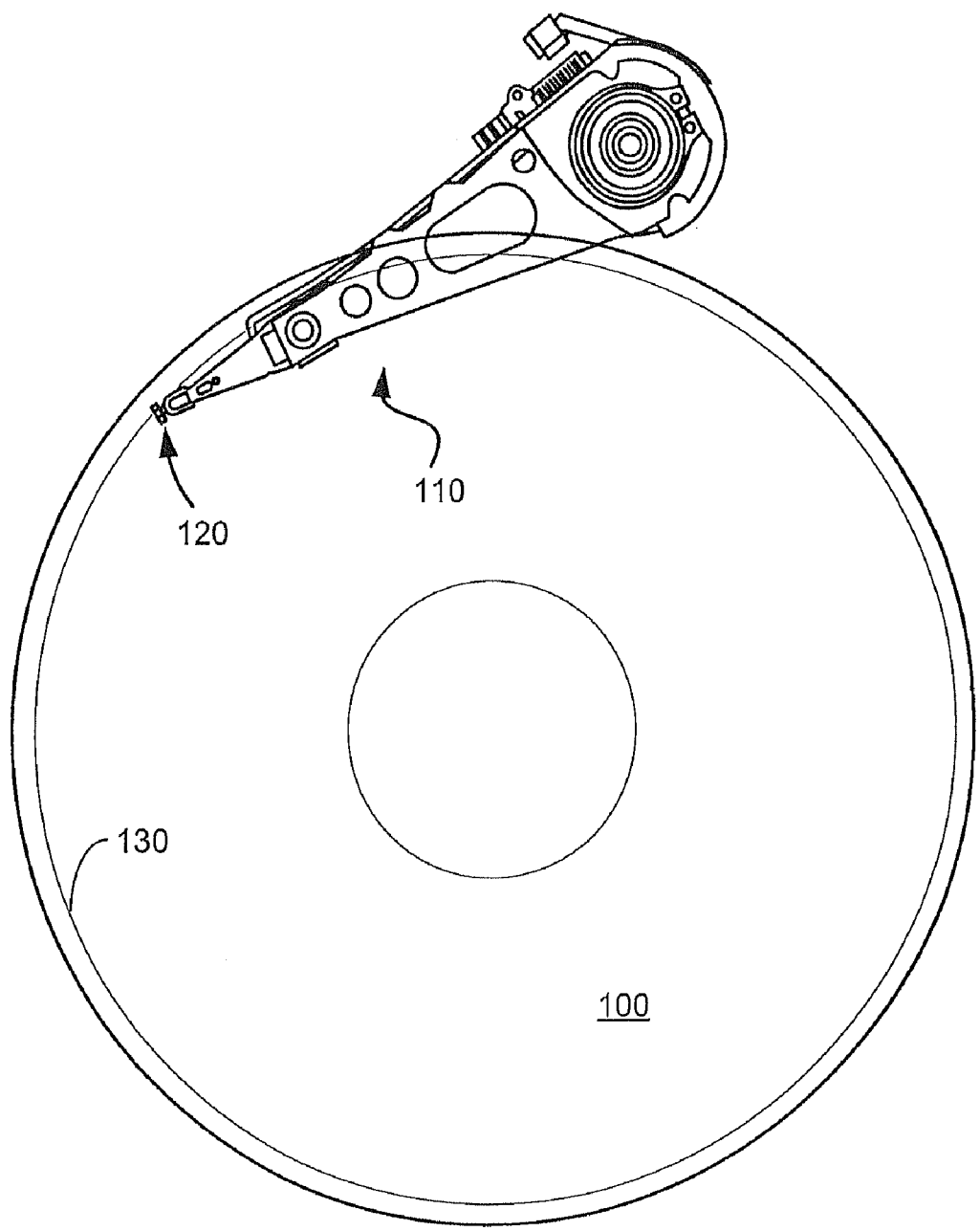
FIG. 1 shows a disc and associated actuator track following a data track on the disc.

While embodiments of this invention can be manifested in many different forms, there is shown in the drawings and will be described herein in detail specific embodiments thereof with the understanding that the present disclosure is to be considered as an exemplification of the principles of the embodiments which are not to be limited to the specific embodiments described.

Figure 2:
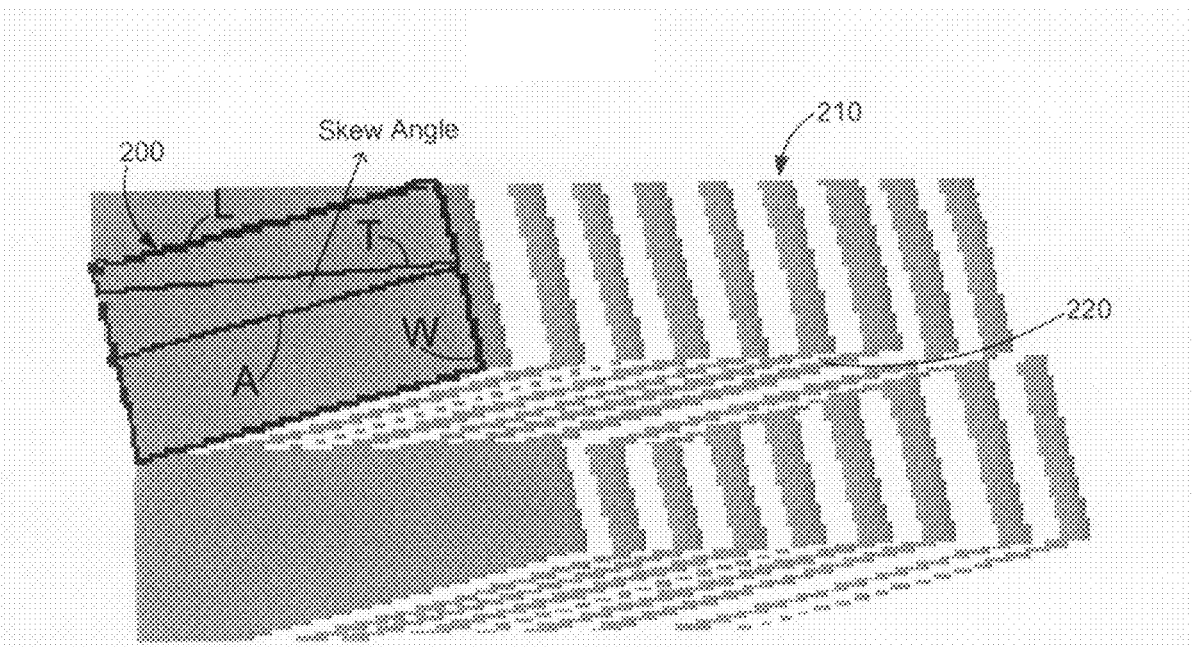
FIG. 2 shows undesired magnetic transition overwriting caused by head skew.

An issue with head skew is that it causes unwanted overwriting of previously written servo information. In general, the skew causes not only the magnetic flux from the leading edge of the writer to create magnetic transitions on the disc, but also the magnetic flux of the sidewall edge of the writer to create magnetic transitions on the disc. In particular, for longitudinal recording, a writer tip of the head is rectangular. Referring to FIG. 2, a writer tip 200 has a leading edge W, a sidewall edge L and a longitudinal axis A. The leading edge W of the trailing pole of the writer 200 writes magnetic transitions 210 on the disc. A line T represents the center of the servo track portion that is being written. Line T is tangent to the radial position at that point. The angle between line T and axis A defines the skew angle. The effect of the sidewall edge L—shown by 220—is proportional to the skew angle and the dimension of the sidewall edge L. In perpendicular recording, the writer tip of the head has a square footprint, i.e. the sidewall edge is shorter than that of the longitudinal writer sidewall edge L. This writer dimension change combined with the properties of perpendicular recording makes the undesired sidewall writing more severe in perpendicular recording.

Figures 3A, 3B, 3C:
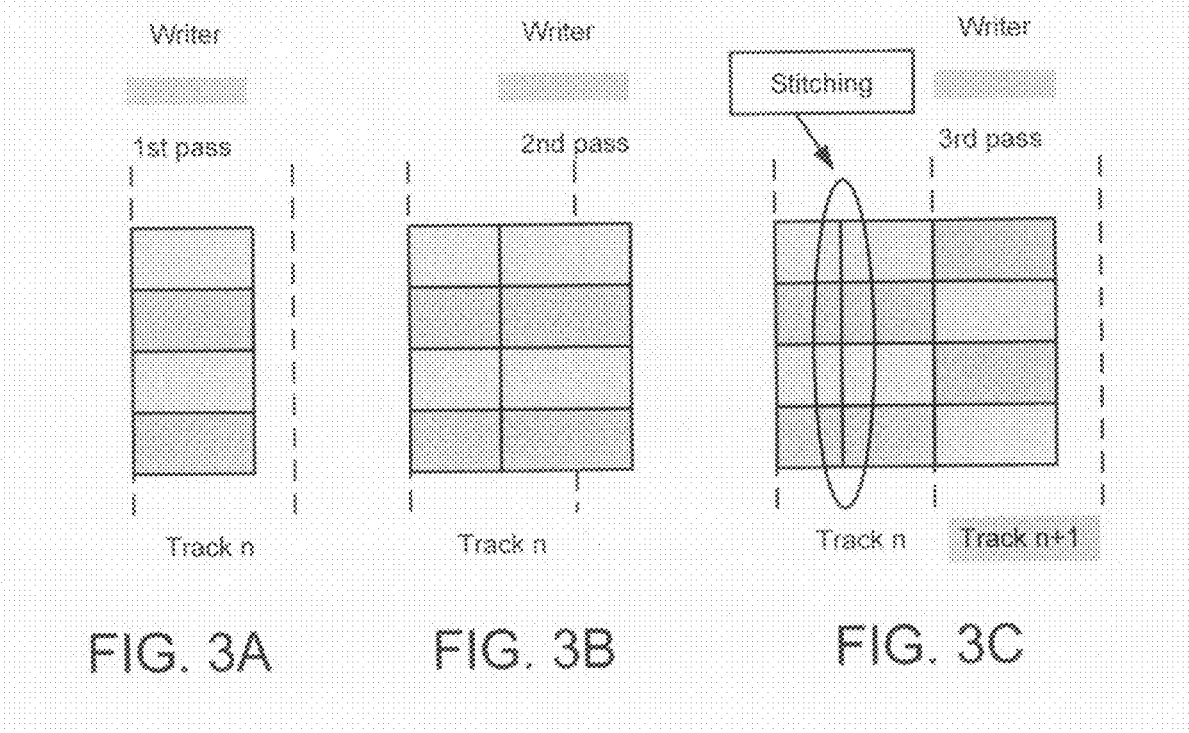
FIGS. 3A-3C generally shows stitching of servo information.

The sidewall writing described above is detrimental to the servo tracks. When servo tracks are written, at least two writing passes are typically used to write one data track. The stitching between two writing passes is very vulnerable to the sidewall writing. FIGS. 3A-C demonstrate the servo track writing (STW) process and the stitching. In FIG. 3A, a first pass for servo track writing on data track n is performed. In FIG. 3B, a second pass for servo track writing on data track n is performed. FIG. 3C shows a third pass, which is the start of servo track writing for data track n+1. The stitching shown in FIG. 3C shows how the first two passes (for data track n) abut.

However, typical disc drives have positive skew angles from the OD to about some middle diameter (MD), negative skew angles from about the MD to the ID. When the skew angle changes at about the MD location from positive to negative angles, undesired writing of the sidewall also changes to the other sidewall of the writer tip.

Figure 4:
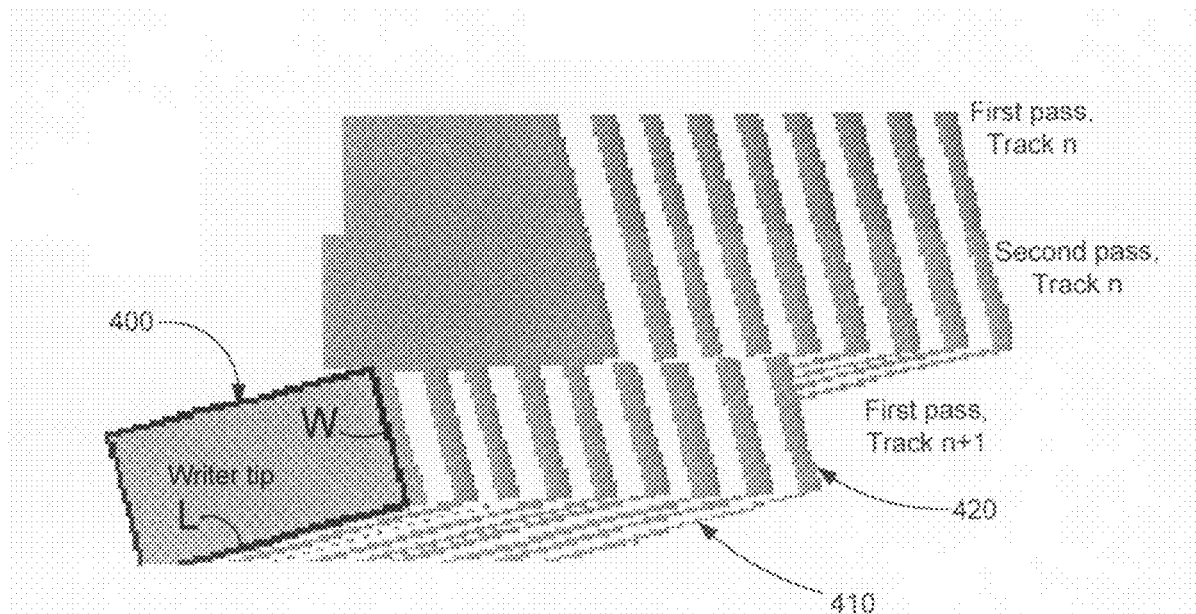
FIG. 4 shows writing servo information in one direction taking into account head skew according to the present invention.

Traditional STW techniques write servo tracks in one direction, usually starting at the OD first, then moving toward the ID to write the following servo tracks. In the positive skew region (from OD to MD), the writer's sidewall writes transitions on one side while the leading edge of the writer writes good transitions on the first pass. This phenomenon is shown in FIG. 4. The first pass of data track n is written by a writer tip 400, which has leading edge W and sidewall edge L. Although blocked by the shown second pass for data track n, the first pass for data track n causes magnetic transitions in the disc similar to the magnetic transitions 410 of the first pass for data track n+1. Note that the sidewall edge L causes transitions 410 that extend at an angle from transitions 420 caused by the leading edge W of the writer tip 400. Then at the second pass, the leading edge writes good transitions on top of the transitions previously created by the sidewall edge L from the first pass. Thus, there is no undesired transition band being left on the media between the passes for the servo track. The stitching between the passes for data track n is as desired.

Figure 5:
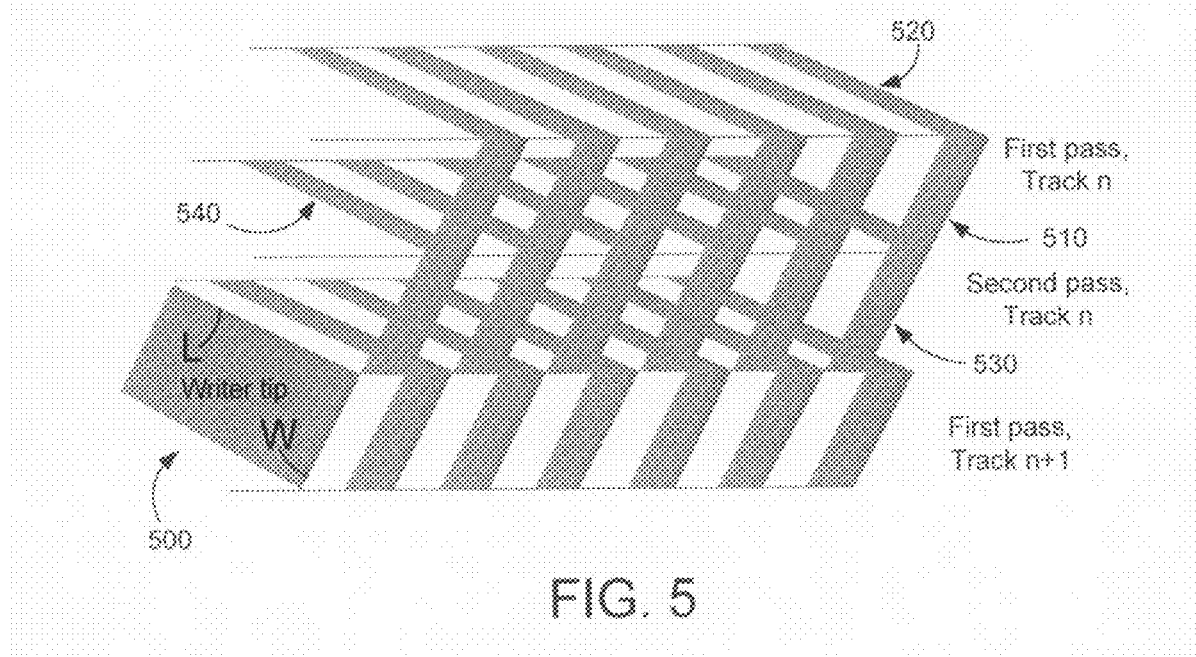
FIG. 5 shows undesired magnetic transition overwriting caused by head skew in the other direction.

In the negative skew region (from MD to ID), the writer writes good transitions on the first pass, then at the second pass starts to write undesired transitions on top of the good transition written in the first pass. Referring to FIG. 5, a writer tip 500 uses a leading edge W to write magnetic transitions 510 during a first pass of servo writing for data track n. A sidewall edge L also writes magnetic transitions 520 during that same pass. Upon the second pass of servo writing for data track n, the leading edge W writes magnetic transitions 530. Yet the sidewall edge L also writes magnetic transitions 540 during that second pass. Magnetic transitions 540, unfortunately, overwrite or interfere with the previous written magnetic transitions 510 of the first pass. Likewise, the first pass of the servo writing for data track n+1 overwrites or interferes with the previously written magnetic transitions 530 of the second pass for data track n. Thus, undesired transition bands are left in the middle of a data track and between data tracks.

Figure 9:
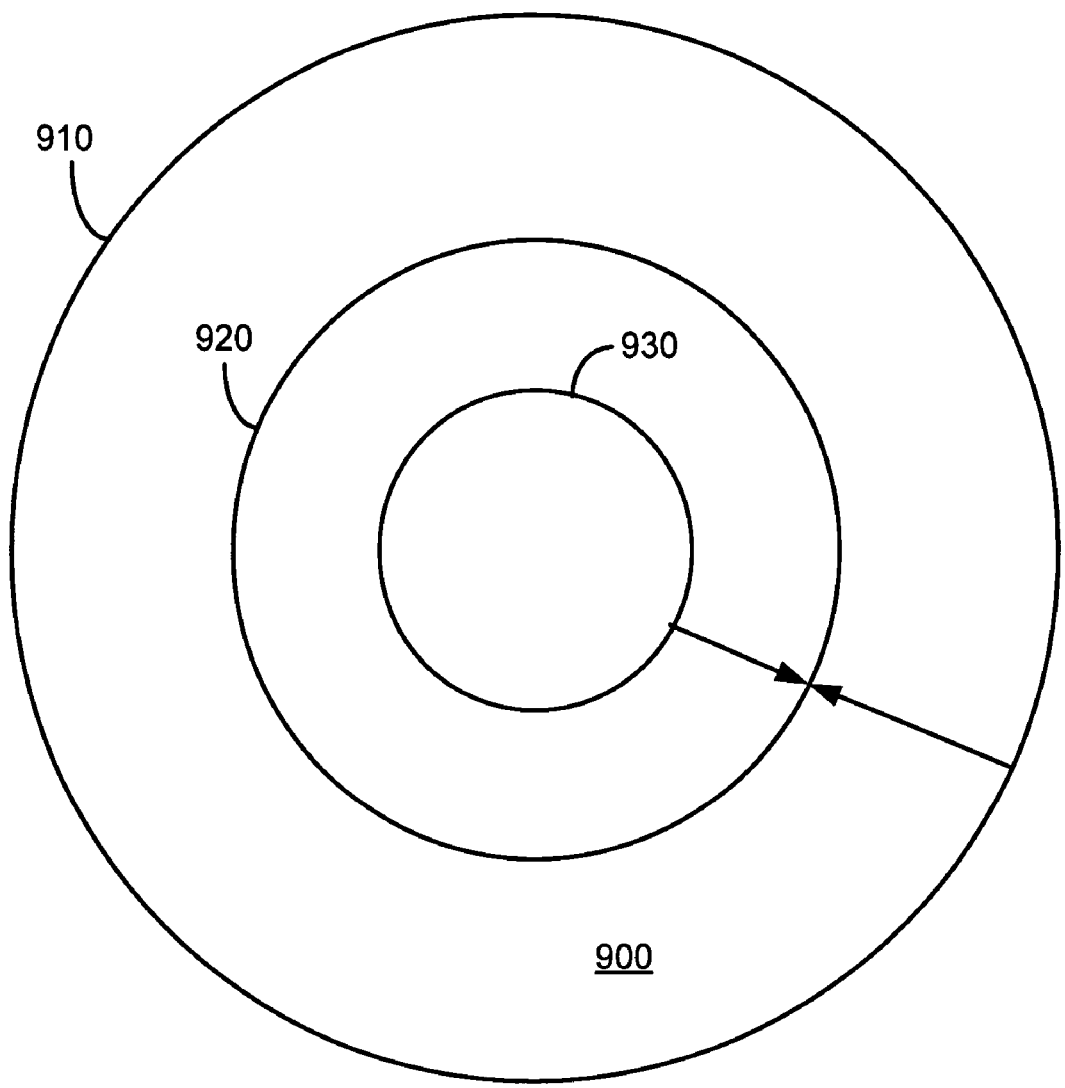
FIG. 9 illustrates a bi-directional servo writing of the present invention.

To overcome this undesired effect caused by the writer skew, the present invention writes the servo information from the OD to about some MD position and then from the ID to about that MD position. In other words, the servo information is written toward the MD from either direction. Referring to FIG. 9, a disc 900 has an OD 910, some MD position 920 and an ID 930. The present invention writes the servo information toward MD 920. For example, the servo information is written from OD 910 to MD 920, and from ID 930 to MD 920 as shown by the arrows. The MD preferably is picked to at least minimize the head skew. The determination of the MD position can be based on other criteria, such as the geometry of the disc, servo error generation or an arbitrary criterion.

Figure 10:
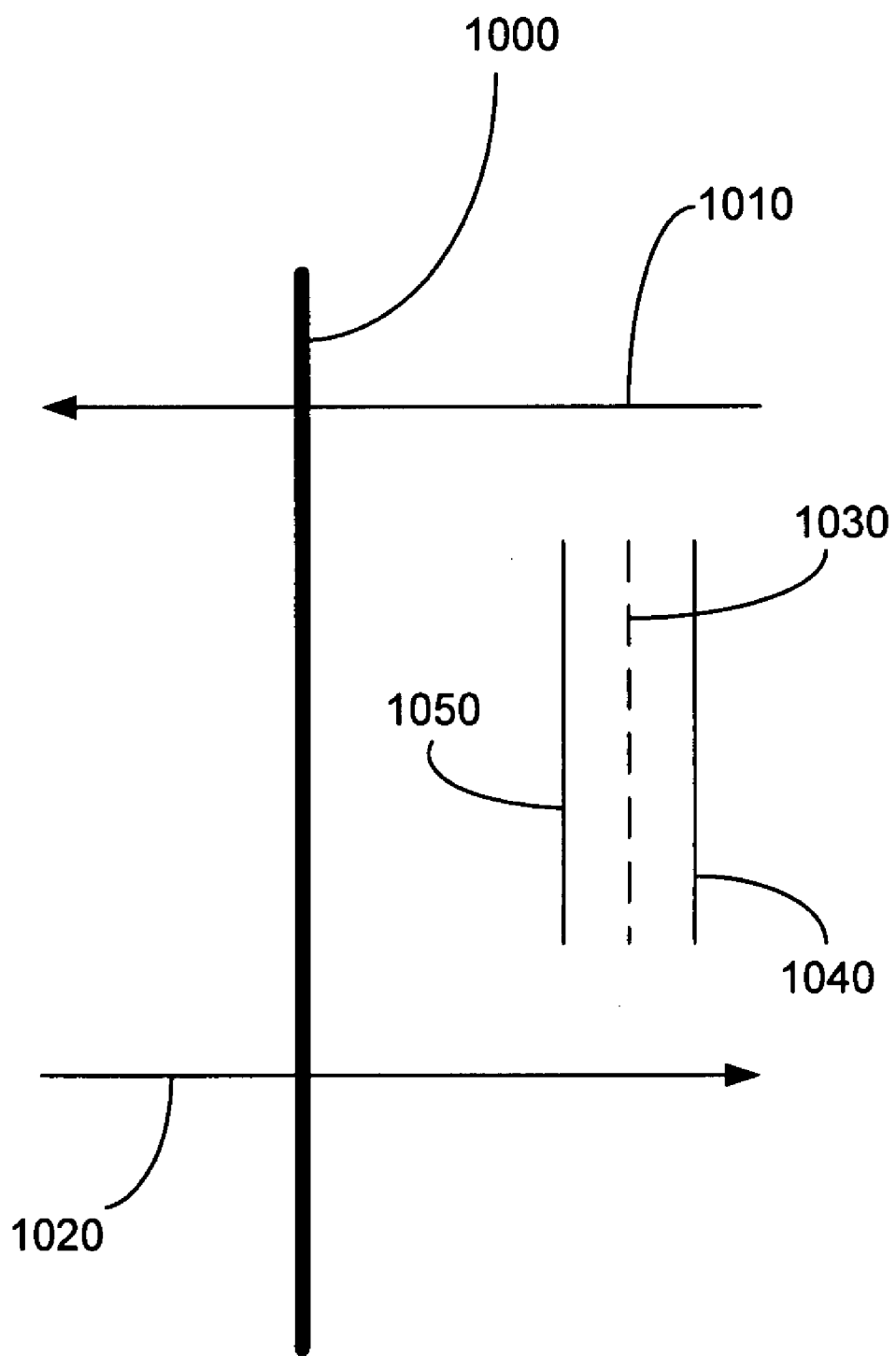
FIG. 10 illustrates preferred embodiments of the bi-directional servo writing of the present invention.

Referring to FIG. 10 for more detail, a predetermined MD position is signified by reference number 1000. The present invention writes data from the OD past MD position 1000 in the direction shown by arrow 1010. Then servo information is written from the ID past MD position 1000 in the direction shown by arrow 1020. In particular, the present invention can write from the OD to just past the MD, such as MD+Δ, then write from the ID to just past MD, say MD+ε, where Δ may equal ε. The symbols Δ and E represent at least one data track each. Where the ID writing ends, a region represented by dashed line 1030 is created where one or more data tracks are not written or magnetic interference between data tracks written in both direction exists. Region 1030 can be bounded by guard bands respectively defined between lines 1030, 1040 and 1030, 1050. A reserved zone can be defined between lines 1040 and 1050 that separates ID and OD written regions. Alternatively, the reserved zone can be defined only as region 1030. In addition, the width of this reserved zone can be based upon the servo track writer's run out or other criterion, such as the effect of PES from non-uniform servo patterns.

When writing the servo information from the OD to the MD, data track address information is incrementally written as typically done. When information from the ID to MD is written, the data track addresses are preferably decremented starting at a nominal data track address plus an offset. The nominal data track address is the nominal number of data tracks per the written disc surface. The offset is added to reduce the chance of having two data tracks with the same physical address. Under this method, when a disc drive is undergoing a certification process, the sector defect management will map the physical addresses to the logical addresses without encountering redundant physical data track addresses.

As discussed above, one method of the present embodiments writes servo information from the OD to the MD as shown partly in FIG. 4. Then, servo information is written from the ID to the MD. Referring to FIG. 6, a writer tip 600 is skewed similarly to writer tip 400 shown in FIG. 4. Writer tip 600 uses a leading edge W to write magnetic transitions 610 during a first pass of servo writing for data track n. Although not shown in FIG. 6, sidewall edge L also writes magnetic transitions relative to magnetic transitions 610 during that same pass that are similar to sidewall magnetic transitions 620. Upon the second pass of servo writing for data track n, the leading edge W writes magnetic transitions 630, that overwrite with the previous written sidewall magnetic transitions of the first pass. Likewise, the first pass of the servo writing for data track n+1 overwrites the previously written sidewall magnetic transitions of the second pass for data track n. Thus, undesired transition bands are minimized, if not altogether eliminated.

MFM images of a servo sector written with a perpendicular head on a perpendicular disc at −10 degree skew angle show the effectiveness of the present invention. FIG. 7A clearly shows that STW from ID to MD provides better stitching between passes for each servo pattern (shown by 700) compared to the servo pattern written from MD to ID shown in FIG. 7B by 710. As shown by the jagged edges in FIG. 7B, erasure occurs in the middle of servo tracks when servo tracks are written from MD to ID.

Figure 8:
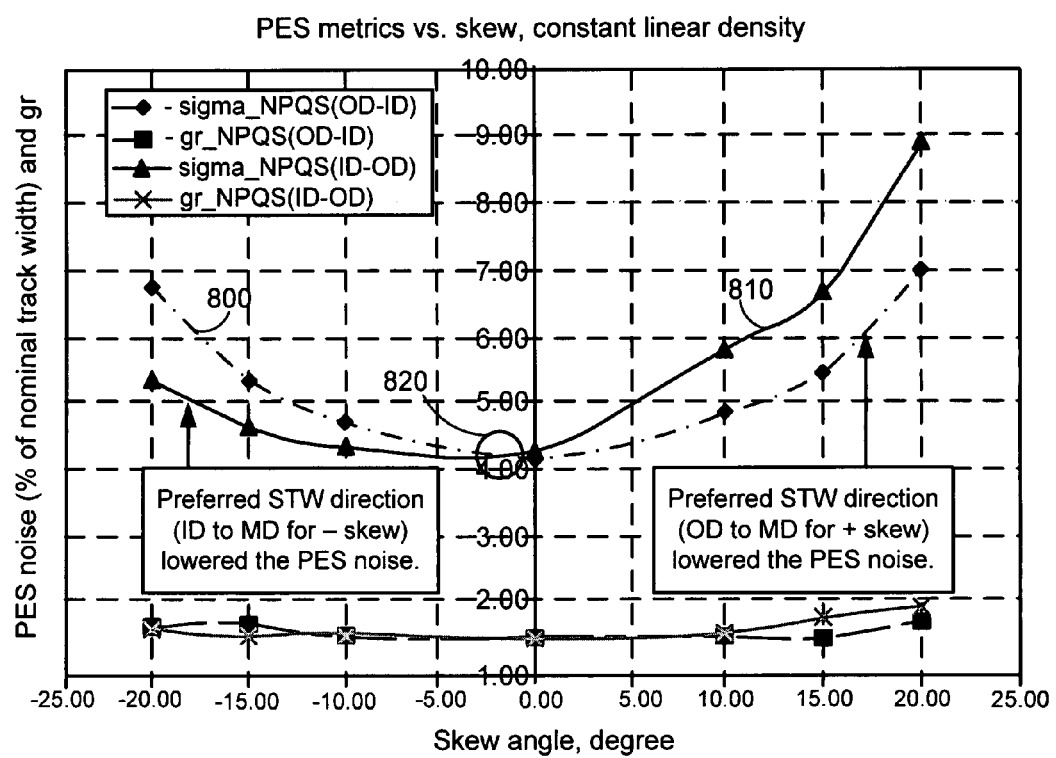
FIG. 8 is a graph showing the effects of skew on a position error signal.

Servo position error signal (PES) data was collected on the servo pattern written bi-directionally according to the present invention. Two PES performance measures, PES noise as a percentage of nominal data track width and gain ratio, are shown in FIG. 8. Other PES metrics can be used, and the present invention is not limited by those shown in FIG. 8. As shown, the gain ratio does not significantly degrade with skew angle no matter which STW direction is. However, PES noise does decrease when servo tracks are written in preferred directions for both positive and negative skew according to the present invention. A solid line 810 in FIG. 8 results from writing servo information from the ID to the OD and a dashed line 800 results from writing servo information from the OD to the ID. Note that FIG. 8 shows the intersection of the two lines at an intersection area 820, which is shown to occur where the head has a negative skew angle. The location of the reserved zone may correspond to this intersection area. FIG. 8 supports that the servo information written bi-directionally will reduce PES noise. In a further embodiment of the present invention, the writing of the servo information can be done up to the MD without crossing. In this way data track interference can be minimized. The reserved zone, which may or may not include at least one guard band, is then defined between the data tracks where the servo information writing ended.

A guard band can be used for data track seeks. For example, an actuator may have a position that is in one zone and the desired data track to be sought is the data track immediately adjacent to the reserved zone, but the reserved zone must be traversed. Data track identification information in at least one data track in the guard zone adjacent the desired data track can be used by the servo system to position the actuator over the desired data track. In other words, any data track in the guard band can be used for providing servo information, other kinds of information or data. Preferably, the data does not include user data.

In current drive systems, as a servo track writer writes sequential data tracks from OD to ID, data track identification numbers are continuous integers starting from 1. When the servo track writer starts to write servo tracks from the ID toward the MD, it can be difficult to determine which data track identification number to start with relative to the data tracks that were written OD to MD. Another embodiment of the present invention writes from the OD to the ID first to estimate how many data tracks can be put on the disc surface, then re-write the negative skew region from ID to MD with known data track identification numbers. Another embodiment divides the entire disc surface into 2 zones: one is OD zone, the other is ID zone. An MSB bit can be allocated to data track the identification field to represent the zone number, for example, 0 as OD zone and 1 as ID zone. Then data tracks can be written from OD to MD first starting from OD zone data track 1 until reaching the reserved zone. Finally data tracks can be written from the ID to the MD starting from the ID zone data track 1. For example, if the current data track identification field has 16 bits, then the new data track identification field will have 17 bits. OD zone data track 1 will have data track identification 0X0000 and ID zone data track 1 will have data track ID 0X10001. A further embodiment encompasses writing servo track information from the ID to about the MD, then from the OD to about the MD.

Figure 11:
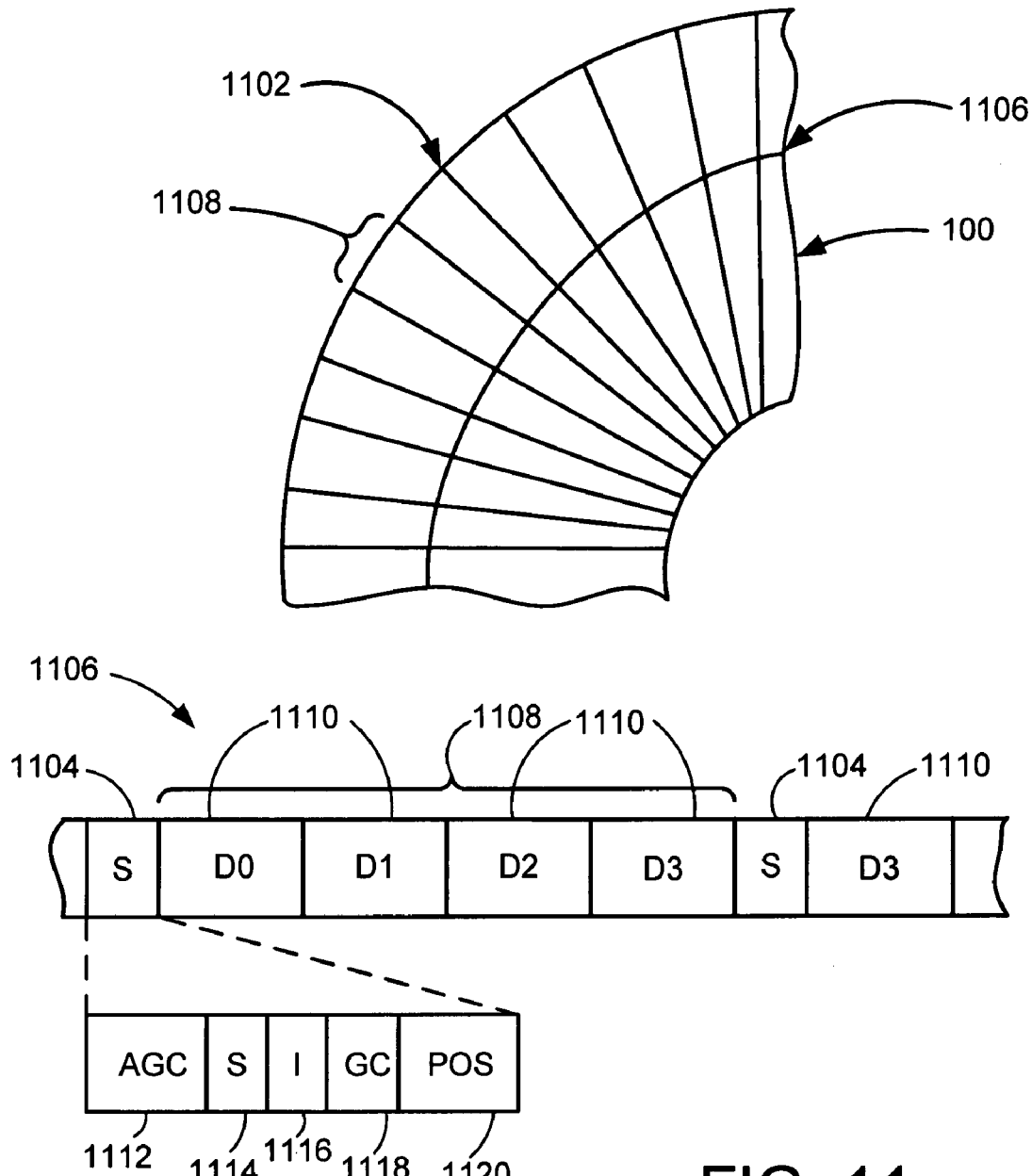
FIG. 11 depicts an arrangement of servo information on a storage media in accordance with related art solutions.

FIG. 11 diagrammatically depicts a manner in which the servo information can be arranged collectively on the recording surface of the disc 100 in related art solutions where the servo information is written uni-directionally, such as from the outer diameter to the inner diameter of the disc 100. Servo information in the form of discrete, substantially equally spaced servo wedges 1102 are written during disc drive manufacturing and radially extend across the recording surfaces from the inner diameter to the outer diameter like spokes on a wheel. Each servo wedge 1102 is formed from servo data fields 1104, with one set of servo data fields 1104 for each track 1106. The servo data are used to detect and control the position of the heads 120 (FIG. 1). The number of servo data fields 1104 per track varies depending upon the configuration of the drive, but a typical number is from about 100 to 300 servo data fields 1104 on each track 1106.

Data wedges 1108 are provided between each adjacent pair of servo wedges 1102. User data fields 1110 (sectors) are subsequently formatted in the data wedges 1108 and are used to store user data in fixed size data blocks, such as 512 bytes.

The general format of each servo data field 1104 includes an automatic gain control (AGC) field 1112, a synchronization field 1114, an index field 1116, a Gray code (track address) field 1118, and a position (POS) field 1120. The AGC field 1112 provides an oscillating preamble signal (such as a 2T pattern) to prepare servo control circuitry for receipt of the remaining servo data. The synchronization field 1114 signals the presence of a servo data field 1104 by storing a unique synchronization pattern that is a selected Hamming distance away from other possible combinations of bit patterns on the disc. The index field 1116 indicates angular position of the servo data field 1104 on the disc 100 with respect to an index point (i.e., zero rotational degrees). The Gray code field 1118 provides a radial track address for the track 1106, and the position field 1120 enables the servo control circuitry to detect intra-track location of the head 120.

The present embodiments contemplates the disc 100 having servo wedges 1102 defining tracks 1106 that are written bi-directionally toward a medial portion of the disc, as described above with respect to FIG. 9 wherein servo track writing in the opposing direction converges at the MD 920. It is noted that the MD 920, sometimes referred to as the medial portion, is not necessarily the "middle diameter" of the storage space. It can be any predetermined medial portion whereat the skew is a negative angle, a positive angle, or a zero angle. Preferably, the predetermined MD angle will be analytically and or empirically determined as that crossover point where minimum PES noise occurs. It will be recalled that this crossover point was slightly in the negative skew realm in the embodiments discussed above with regard to FIG. 8.

At any rate, wherever the predetermined medial portion is defined, there exists the common problem of aligning all the "spoke portions" of servo wedges when writing bi-directionally to provide the servo control of the uni-directionally written "spokes" of servo wedges in FIG. 11.

Figure 12:
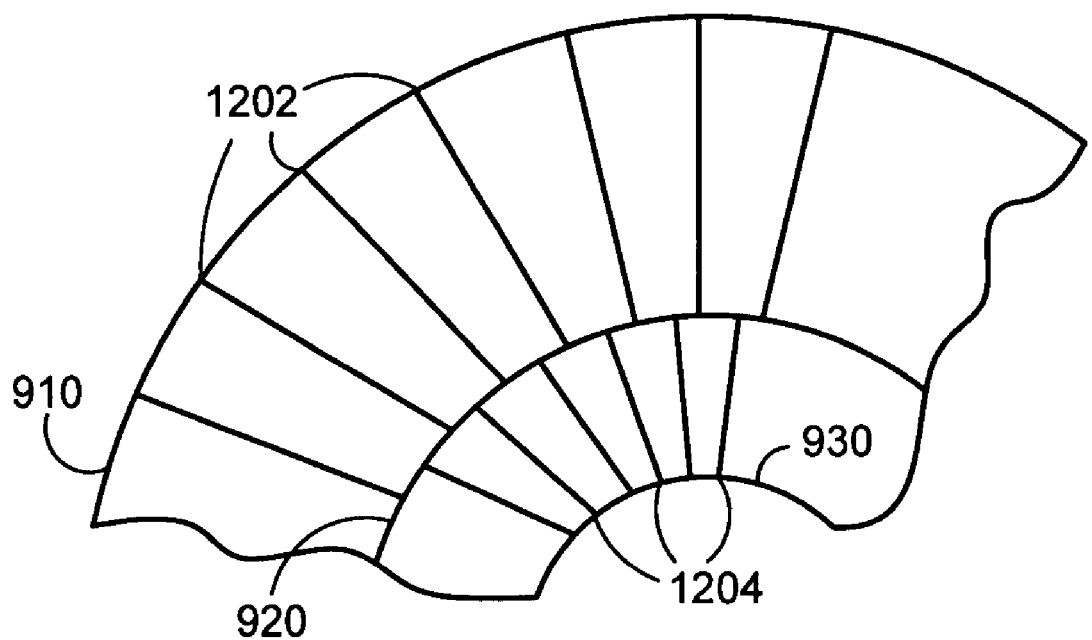
FIG. 12 is similar to a portion of FIG. 11 but having servo information constructed in accordance with embodiments of the present invention.

Accordingly, FIG. 12 is a portion of the disc 100 of FIG. 9 but depicting a first set of servo wedges 1202 that are written from the OD 910 to the MD 920. A second set of servo wedges 1204 are written from the ID 930 to the MD 920, in accordance with the bi-directional servo track writing of the present embodiments. However, the servo wedges 1202 and the servo wedges 1204 are positionally offset, or angularly offset in the depicted embodiments, with respect to each other so that the servo wedges near the MD 920 are positionally interlaced. Note that, like FIG. 11, the size and spacing of the servo wedges 1202 is illustrative only, the number being reduced and the spacing being dramatically increased only for clarity of depiction sake.

Figure 13:
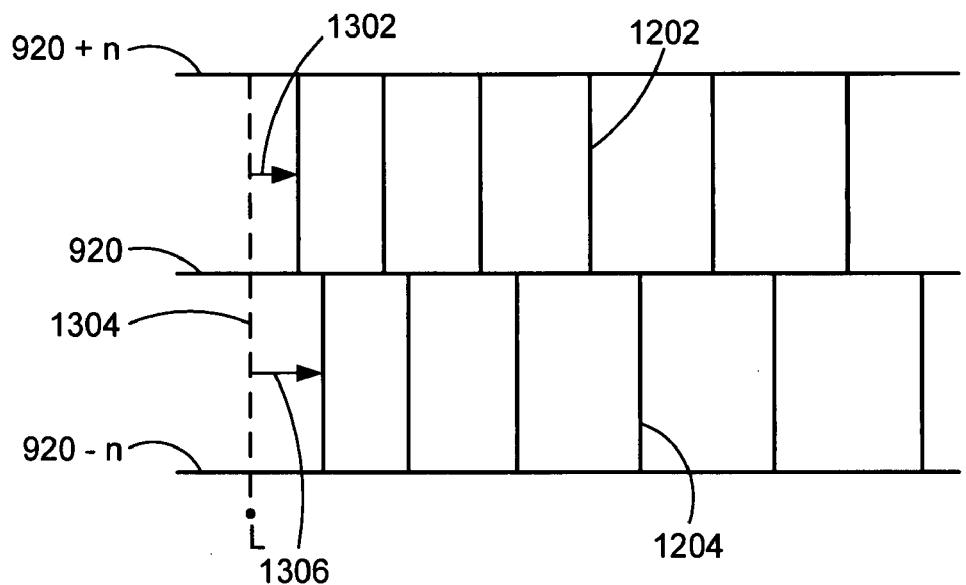
FIG. 13 is a linear depiction of the servo information of FIG. 12.

FIG. 13 is a linear depiction of the substantially equally spaced servo wedges 1202 written from the OD 910 to the MD 920 being disposed at a first angular orientation 1302, or offset, with respect to an angular reference 1304 of the disc 100 denoted as "i," which can be for example a timing reference such as a zero degree timing reference of the disc 100. The servo wedges 1204 written from the ID 930 to the MD 920 are likewise substantially equally spaced but disposed at a second angular orientation 1306 with respect to the angular reference 1304 that is different than the first angular orientation 1302.

Figure 14:
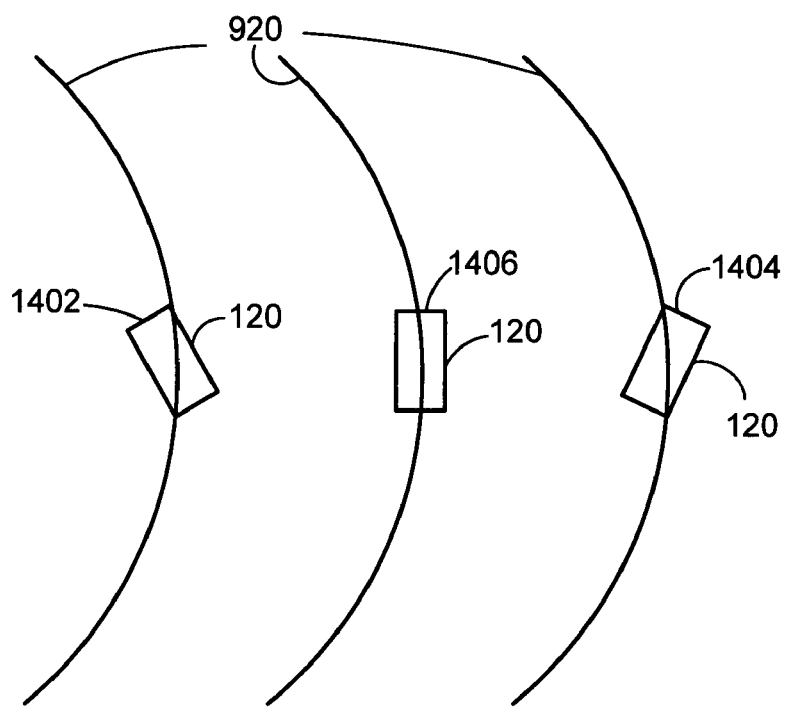
FIG. 14 depicts the head disposed at each of a negative skew angle, a zero skew angle, and a positive skew angle.

The servo wedges 1202, 1204 are written to the disc 100 while rotating the actuator 110 so that its longitudinally extending arm supporting head 120 moves from the OD 910 toward the MD 920 and from the ID 930 to the MD 920, in either order of operation. In some embodiments the head 120 movement can be made to stop at the MD 920 in both radial directions. Again, FIG. 14 shows that the ultimate mutual stopping position at the predetermined MD 920 can be at a negative skew angle 1402, a positive skew angle 1404, or a zero skew angle 1406 of a longitudinal axis of the head 120 with respect to a tangent of the MD 920. Where the actuator 110 is equipped with microactuation capability, it can be possible for the skew angle with respect to the head 120 to be different than the skew angle with respect to the actuator arm at and near the MD 920.

Figure 15:
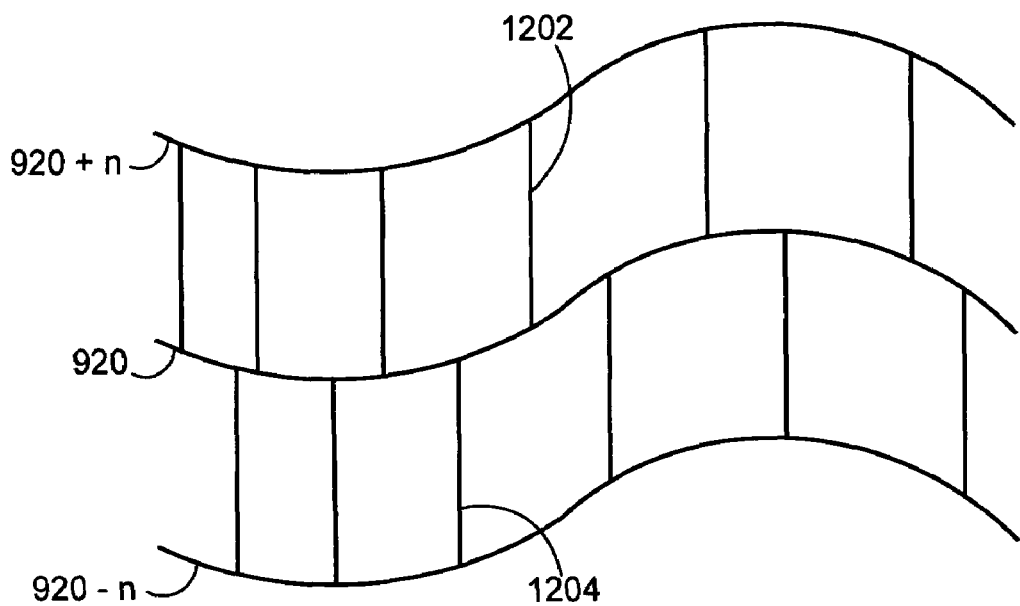
FIG. 15 is similar to FIG. 13 but depicting non-circular servo tracks.

FIG. 15 depicts a view similar to FIG. 13 but showing the outer zone of servo wedges 1202 and the inner zone of servo wedges 1204 terminating at a non-circular MD 920 as is typically associated with repeatable runout in the tracks. Although not depicted, the present embodiments also contemplates the outer and inner zones of servo wedges 1202, 1204 terminating with respect to a virtual track where they are used to approximate circular tracks to simplify the processing overhead of tracking to non-circular tracks due to repeatable runout. In any case, in some embodiments the sets of interlaced servo wedges can both end at the MD 920 so that both sets are disposed in a common track, or in alternative embodiments an offset from the MD 920 can be defined so that adjacent sets in the two zones are disposed in different tracks.

Figure 16:
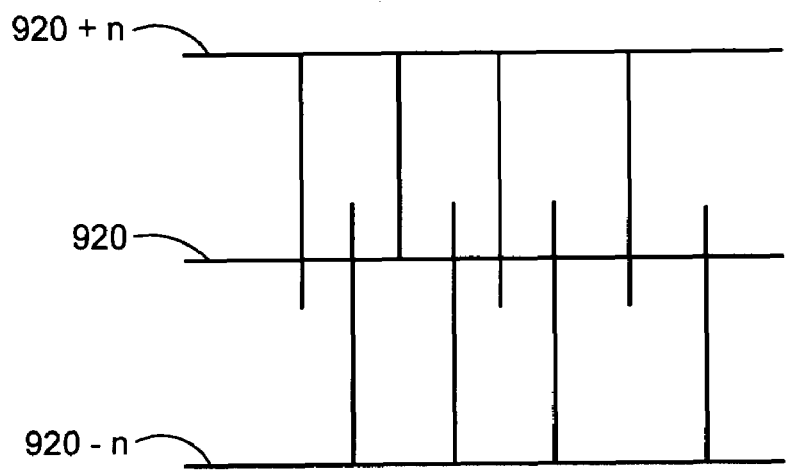
FIG. 16 is a view similar to FIG. 13 but depicting overlapping servo wedge sets in accordance with embodiments of the present invention.

FIG. 16 depicts alternative embodiments whereby both the outer zone of servo wedges 1202 and the inner zone of servo wedges are written radially beyond the MD 920 so that they overlap near the MD 920. Preferably, the overlapping portions extending at and/or beyond the MD 920 are subsequently overwritten to yield the arrangement depicted in FIG. 13. Overlapping can likewise be done in non-circular tracks as depicted in FIG. 15 or in virtual tracks as well.

The servo wedges 1202, 1204 contain information encoded in the servo fields 1104 to distinguish one set from the other for positional control in switching servo sampling between the sets. In some embodiments, such as where overlapping servo wedges exist, the servo field information can differentiate on the basis of which servo wedge it is based on the direction the tracks were written that contain the respective servo wedges. In other embodiments, such as where no overlapping exists, the servo field information can differentiate on the basis of which zone the respective servo wedge resides.

Figure 17:
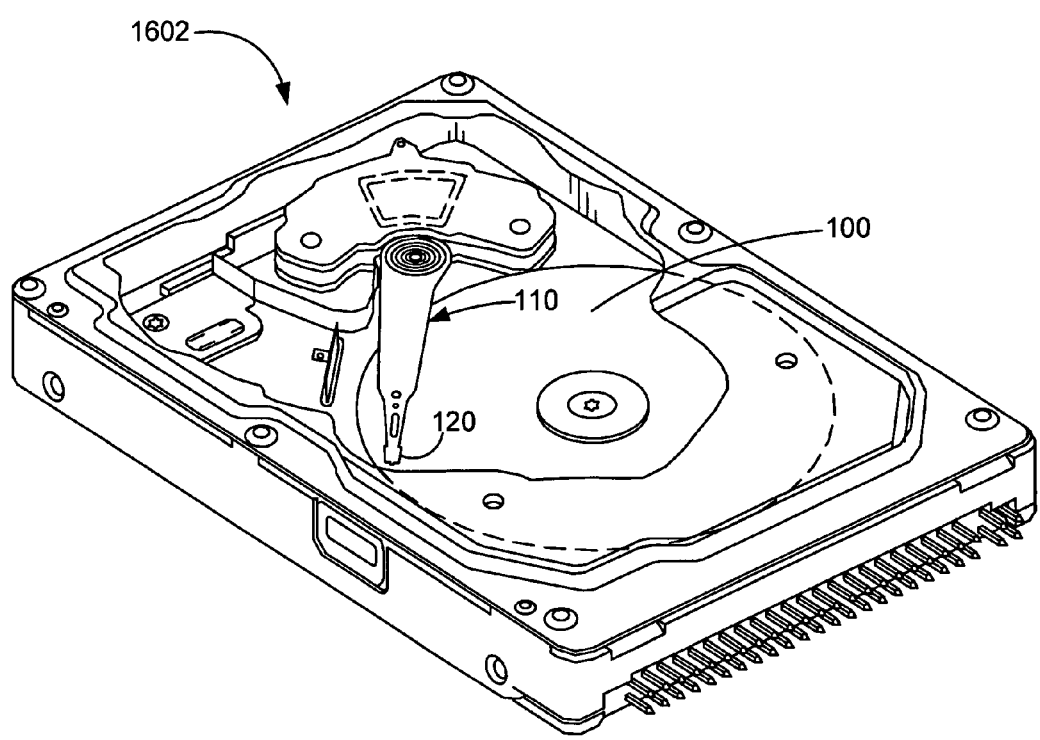
FIG. 17 depict a data storage device configured for practicing embodiments of the present invention.
Figure 18A:
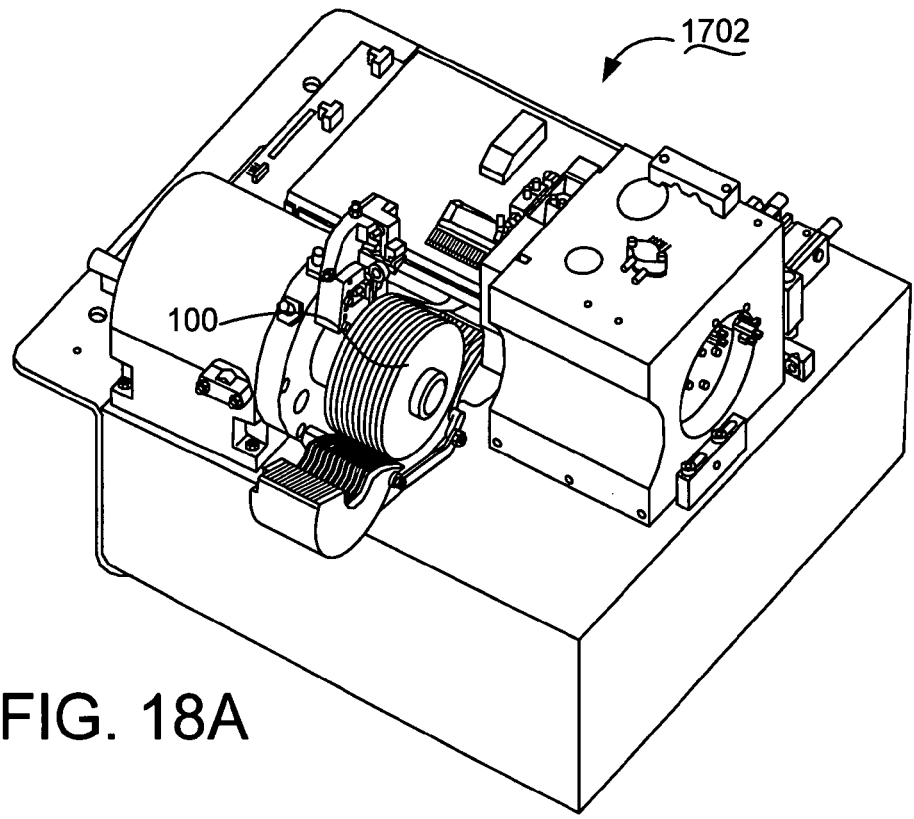
FIGS. 18A and 18B depict a multi-disc servo track writer configured for practicing embodiments of the present invention.
Figure 18B:
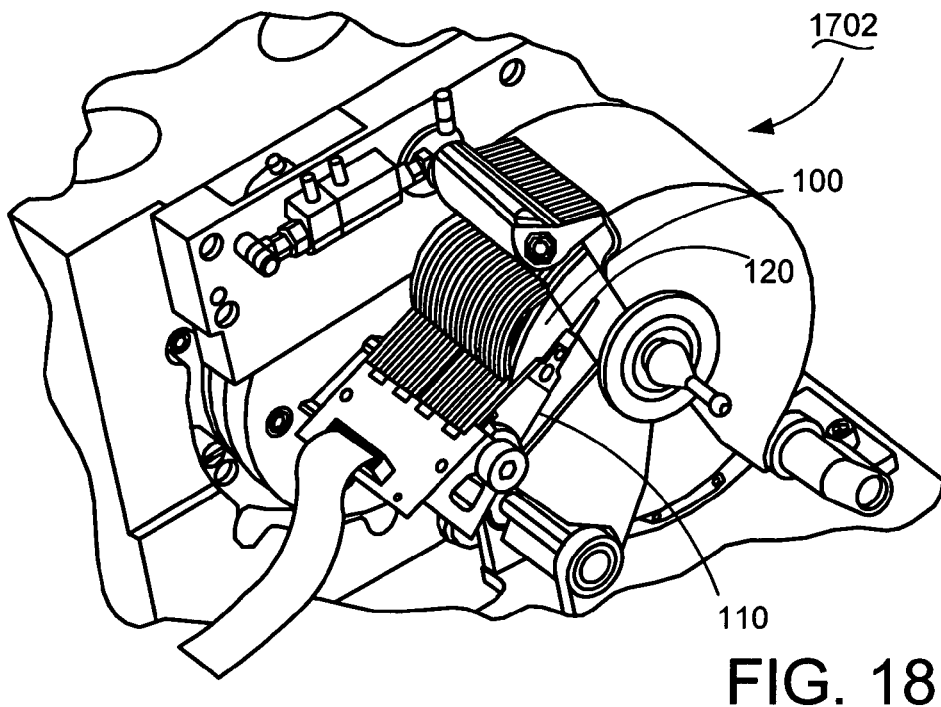

The methods for bi-directional servo track writing contemplated by the present embodiments are generally performed by a servo track writing device executing programming instructions stored on computer readable media. In some embodiments the servo track writing device can be a data storage device 1602 as depicted in FIG. 17 programmed for in-situ servo track writing. In alterative embodiments the servo track writing device can be a multi-disc writer device 1702 as depicted in FIGS. 18A and 18B.

Generally, embodiments of the present invention contemplate a data storage device having an actuator that is moveable with respect to a storage media in a data transfer relationship therewith, and means for retrieving servo information stored to the media in an outer zone of the media between a predetermined position of the actuator and a data storage extent of the media, and stored to the media in an inner zone of the media between the predetermined position and an opposing storage extent of the media. For purposes of this description and meaning of the appended claims "means for retrieving" encompasses the structures disclosed herein and structural equivalents thereof that are capable of retrieving data from servo information written bi-directionally and continuously across the entire extent of data storage space.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts and values for the described variables, within the principles of the present invention to the full extent indicated by the broad general meaning of the terms in which the appended claims are expressed. For example, the particular elements may vary depending on the particular application for the servo system while maintaining substantially the same functionality without departing from the scope and spirit of the present invention. Although the present invention is preferably applied to perpendicular recording applications, it is also applicable to longitudinal recording applications.

In addition, although the preferred embodiment described herein is directed to servo track writing for a disc drive system, it will be appreciated by those skilled in the art that the teachings of the present invention can be applied to other systems, without departing from the scope and spirit of the present invention. The disc drive can be based upon magnetic, optical, or other storage technologies and may or may not employ a flying slider.

What is claimed is:

1. A method of servo writing to a storage media comprising:
    writing servo information at a first orientation pattern from a first storage extent of the storage media to a medial portion of the storage media; and
    writing servo information at a second orientation pattern different than the first orientation pattern from an opposing storage extent of the storage media to approximately the medial portion; and
    wherein the writing servo information steps comprise storing a predefined value to an indicator bit in a servo field in each of a plurality of servo sectors, the indicator bit dedicated to identifying which orientation pattern a particular servo sector is a part of irrespective of an angular stored position of the particular servo sector on the storage media.

2. The method of claim 1 wherein the writing the servo information steps comprise overlapping the first and second orientation patterns in the medial portion.

3. The method of claim 1 wherein a first zone is defined between the first storage extent of the storage media and a first predetermined medial diameter and a second zone is defined between the opposing storage extent of the storage media and a second predetermined medial diameter, further comprising overwriting any existing first orientation pattern servo information that is not located in the first zone but not overwriting the first orientation pattern servo information in the first zone.

4. The method of claim 3 wherein the first predetermined medial diameter and the second predetermined medial diameter are the same.

5. The method of claim 3 further comprising overwriting any existing second orientation pattern servo information that is not located in the second zone but not overwriting the second orientation pattern servo information in the second zone.

6. The method of claim 1 wherein the media is a rotating media and wherein the writing servo information at a first orientation pattern comprises writing a plurality of discrete substantially equally spaced servo wedges at a first angular orientation with respect to an angular reference of the media, and wherein the writing servo information at a second orientation pattern comprises writing a plurality of discrete substantially equally spaced servo wedges at a second angular orientation with respect to the angular reference different than the first angular orientation.

7. The method of claim 1 wherein the writing servo information steps comprise employing a rotatable actuator having a longitudinally extending arm supporting a data transfer member, wherein the writing servo information at a first orientation pattern is characterized by rotating the arm to move the data transfer member from an outer diameter of the media to a medial track, and wherein the writing servo information at a second orientation pattern is characterized by rotating the arm to move the data transfer member from an inner diameter of the media to the medial track.

8. The method of claim 7 wherein the writing servo information steps are characterized by the medial track being where the data transfer member operably defines a predetermined skew angle.

9. The method of claim 8 wherein the writing servo information steps are characterized by the predetermined skew angle being one of a negative degree angle, a positive degree angle, and a zero degree angle.

10. The method of claim 1 characterized by performing the writing servo information steps by a servo track writing device executing programming instructions stored on computer readable media.

11. The method of claim 1 wherein a first zone is defined between the first storage extent of the storage media and a predetermined medial diameter of the storage media and a second zone is defined between the opposing storage extent of the storage media and the predetermined medial diameter, wherein the predetermined medial diameter is defined at an intersection of a first plot of observed error and a second plot of observed error, the first plot of observed error obtained by reading data across the storage media in a direction from the first storage extent to the opposing storage extent and the second plot of observed error obtained by reading data across the storage media in a direction from the opposing storage extent to the first storage extent.

12. A method of servo writing to a storage media comprising:
writing servo information at a first orientation pattern by moving a data transfer member from adjacent a first storage extent of the storage media to approximately adjacent a predetermined medial diameter of the storage media; and
writing servo information at a second orientation pattern different than the first orientation pattern by moving the data transfer member from adjacent an opposing storage extent of the storage media to approximately adjacent the predetermined medial diameter of the storage media; and
overwriting any existing first orientation pattern servo information that is not located in a first zone between the first storage extent and the predetermined diameter but not overwriting the first orientation pattern servo information in the first zone, and overwriting any existing second orientation pattern servo information that is not located in a second zone between the opposing storage extent and the predetermined medial diameter but not overwriting the second orientation pattern servo information in the second zone.

13. The method of claim 12 wherein the writing servo information steps comprise including information in the servo information associating the servo information with which zone it is in.

14. The method of claim 12 wherein the first orientation pattern and the second orientation pattern are positionally interlaced with respect to each other.

15. An apparatus comprising a storage media having servo wedges defining tracks that are written bi-directionally toward a medial portion of the media, wherein servo wedges written in one direction comprise a servo field indicator bit set to a first predetermined value and servo wedges written in the other direction comprise the servo field indicator bit set to a second predetermined value, the servo field indicator bit dedicated to identifying which direction a particular servo wedge was written irrespective of an angular stored position of the particular servo wedge on the storage media.

16. The apparatus of claim 15 wherein the servo wedges written in one direction overlap the servo wedges written in the other direction near the medial portion.

17. The apparatus of claim 15 wherein the media is a rotating media and wherein the servo wedges written in one direction are substantially equally spaced and stored at a first angular position with respect to an angular reference of the media, and wherein the servo wedges written in the other direction are substantially equally spaced and stored at a second angular position with respect to the angular reference different than the first angular position.

18. The apparatus of claim 15 wherein the servo wedges are written to the media by a rotatable actuator having a longitudinally extending arm supporting a data transfer member, wherein the servo wedges written in one direction are written by rotating the arm to move the data transfer member from an outer diameter of the media to a medial track, and the servo wedges written in the other direction are written by rotating the arm to move the data transfer member from an inner diameter of the media to the medial track.

19. The apparatus of claim 18 wherein the medial track is where the data transfer member operably defines a predetermined skew angle.

20. The apparatus of claim 19 wherein the predetermined skew angle is one of a negative degree angle, a positive degree angle, and a zero degree angle.

21. The apparatus of claim 15 wherein the servo wedges written in one direction are in a first zone between an outer portion of the media and the medial portion, wherein the servo wedges written in the other direction are in a second zone between an inner portion of the media and the medial portion, and wherein the servo field indicator bit indicates which zone the respective servo wedge is associated with.

22. The apparatus of claim 21 wherein adjacent sets of servo wedges in different zones are stored in the same track.

* * * * *